US012797281B2

(12) United States Patent
Lee et al.

(10) Patent No.: US 12,797,281 B2
(45) Date of Patent: Nov. 17, 2026

(54) WALKING ASSISTANCE APPARATUS

(71) Applicant: Samsung Electronics Co., Ltd., Suwon-si (KR)

(72) Inventors: Youn Baek Lee, Yongin-si (KR); Jongwon Lee, Hwasung-si (KR); Byungjune Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 904 days.

(21) Appl. No.: 17/563,122

(22) Filed: Dec. 28, 2021

(65) Prior Publication Data

US 2022/0117826 A1 Apr. 21, 2022

Related U.S. Application Data

(63) Continuation of application No. 16/508,906, filed on Jul. 11, 2019, now Pat. No. 11,207,235.

(30) Foreign Application Priority Data

Jul. 13, 2018 (KR) ........................ 10-2018-0081857

(51) Int. Cl.
*A61H 3/00* (2006.01)

(52) U.S. Cl.
CPC ....... *A61H 3/00* (2013.01); *A61H 2201/1215* (2013.01); *A61H 2201/1626* (2013.01); *A61H 2201/1642* (2013.01); *A61H 2201/165* (2013.01)

(58) Field of Classification Search
CPC .... A61H 3/00; A61H 3/008; A61H 2003/001; A61H 2003/002; A61H 2003/005; A61H 1/00; A61H 1/0262; A61H 1/0266; A61H 2205/10; A61H 2205/102; A61H 2205/104; A61H 2205/106; A61H 2205/108;

(Continued)

(56) References Cited

U.S. PATENT DOCUMENTS 3,009,461 A * 11/1961 Collins ................ A61H 1/0218 602/33
7,416,538 B2 8/2008 Katoh et al.
7,780,616 B2 8/2010 Katoh et al.

(Continued)

FOREIGN PATENT DOCUMENTS

CN 103845186 A 6/2014
CN 104490568 A 4/2015

(Continued)

OTHER PUBLICATIONS

KR20170053020 machine translation accessed Dec. 3, 2024 (Year: 2024).*

(Continued)

*Primary Examiner* — Brandy S Lee
*Assistant Examiner* — Kelsey Rhee
(74) *Attorney, Agent, or Firm* — Nixon & Vanderhye P.C.

(57) ABSTRACT

A walking assistance apparatus includes a rear support module configured to support a rear portion of a waist of a user, a driving module configured to provide a power to assist a motion of a hip joint of the user, a thigh support connected to the driving module, the thigh support configured to support a thigh of the user, and a waist frame including a pair of shafts configured to connect the rear support module and the driving module.

12 Claims, 8 Drawing Sheets

1

(58) Field of Classification Search
CPC ........ A61H 2205/12; A61H 2201/5007; A61H 2201/5012; B25J 9/0006
See application file for complete search history.

(56) References Cited

U.S. PATENT DOCUMENTS

| | | | |
|---|---|---|---|
| 8,652,075 B2 | 2/2014 | Takahashi et al. | |
| 9,400,169 B2 | 7/2016 | Zhou | |
| 9,846,307 B2 | 12/2017 | Tremblay et al. | |
| 2007/0056592 A1* | 3/2007 | Angold | A61H 1/024 128/845 |
| 2008/0297614 A1 | 12/2008 | Lieberman et al. | |
| 2010/0198116 A1* | 8/2010 | Hirata | A61H 1/0244 601/34 |
| 2012/0016278 A1* | 1/2012 | Nakashima | A61H 1/024 601/34 |
| 2012/0316477 A1* | 12/2012 | Hamaya | A61H 3/00 429/99 |
| 2017/0056276 A1* | 3/2017 | Lee | A61F 5/0193 |
| 2017/0086990 A1 | 3/2017 | Choi et al. | |
| 2017/0128234 A1 | 5/2017 | Roh et al. | |
| 2017/0151120 A1* | 6/2017 | Lee | A61H 1/0266 |
| 2018/0125692 A1 | 5/2018 | Takenaka et al. | |
| 2020/0069505 A1* | 3/2020 | Fujita | A61H 1/024 |

FOREIGN PATENT DOCUMENTS

| | | | |
|---|---|---|---|
| CN | 105362041 A | 3/2016 | |
| CN | 106466220 A | 3/2017 | |
| CN | 106473903 A | 3/2017 | |
| CN | 106798628 A | 6/2017 | |
| CN | 107928996 A | 4/2018 | |
| CN | 108114414 A | 6/2018 | |
| CN | 108245379 A | 7/2018 | |
| EP | 3 173 058 A2 | 5/2017 | |
| EP | 3 246 285 A1 | 11/2017 | |
| JP | 2010-124871 A | 6/2010 | |
| JP | 5051529 B2 | 10/2012 | |
| JP | 5161036 B2 | 3/2013 | |
| JP | 2014-161484 A | 9/2014 | |
| JP | 5653626 B2 | 1/2015 | |
| JP | 2016-214976 A | 12/2016 | |
| KR | 10-1222916 B1 | 1/2013 | |
| KR | 2014-0138572 A | 12/2014 | |
| KR | 10-2016-0009833 A | 1/2016 | |
| KR | 20170053020 A * | 5/2017 | B25J 9/0006 |
| KR | 10-2017-0061568 A | 6/2017 | |
| KR | 10-1826962 B1 | 2/2018 | |
| KR | 2020-0008086 A | 1/2020 | |
| WO | WO 2016/021103 A1 | 2/2016 | |
| WO | WO 2016/128877 A1 | 8/2016 | |

OTHER PUBLICATIONS

U.S. Appl. No. 16/508,906, filed Jul. 11, 2019; Lee et al.
"Effects of assistance timing on metabolic cost: assistance power, and gait paramaters for hip-type exoskeleton", Jusuk Lee et al., 2017 International Canfcrence on Rehabilitation Robotics (ICORR), Jul. 17, 2017.
"Flexible Sliding Frame for Gait Enhancing Mechatronic System (GEMS)" Youngbaek Lee et al., Conf Proc IEEE Eng Med Biol Soc. Aug. 2016.
Korean Notice of Allowance dated Jun. 28, 2023 for KR Application No. 10-2018-0081857.
Korean Office Action dated Dec. 19, 2022 for KR Application No. 10-2018-0081857.
European Extended Search Report dated Oct. 7, 2022 for EP Application No. 22171345.6.
Chinese Office Action dated Nov. 28, 2022 for CN Application No. 201910629295.1.
European Office Action dated Sep. 10, 2024 for EP Application No. 22171345.6.
Korean Office Action dated Sep. 29, 2024 for KR Application No. 10-2024-0083007.
European Office Action dated Jul. 28, 2025 issued in European Patent Application No. 22171345.6, 9 pp.
Chinese Office Action dated Jan. 23, 2026 issued in Chinese Patent Application No. 202311317164.2 and English translation, 28 pp.
European Communication under Rule 71(3) EPC dated Mar. 18, 2026 issued in European Patent Application No. 22171345.6, 35 pp.
Chinese Office Action dated Sep. 5, 2026 issued in Chinese Patent Application No. 202311317164.2 and English translation, 12 pp.

* cited by examiner

WALKING ASSISTANCE APPARATUS

CROSS-REFERENCE TO RELATED APPLICATION

This application is a Continuation of U.S. application Ser. No. 16/508,906, filed Jul. 11, 2019, which claims priority to KR 10-2018-0081857, filed on Jul. 13, 2018, 2014, the entire contents of which are all hereby incorporated herein by reference in their entireties.

BACKGROUND

1. Field

At least one example embodiment relates to a walking assistance apparatus.

2. Description of the Related Art

Walking assistance apparatuses enabling the elderly and/or patients having joint problems to walk with less effort, and walking assistance apparatuses increasing muscular strength of users for military purposes are being developed.

SUMMARY

Some example embodiments relate to a walking assistance apparatus.

In some example embodiments, the walking assistance apparatus includes a rear support configured to support a rear portion of a waist of a user; a driver configured to provide a power to assist a motion of a hip joint of the user; a thigh support connected to the driver, the thigh support configured to support a thigh of the user; and a waist frame including a pair of shafts configured to connect the rear support and the driver.

In some example embodiments, the driver includes a driving source configured to generate a rotational power, and the pair of shafts includes a first shaft and a second shaft, the first shaft being on a first side of the driver and the second shaft being on a second side of the driver such that a center of the driver is between the first shaft and the second shaft.

In some example embodiments, the first shaft includes a first hollow extending in a longitudinal direction of the first shaft.

In some example embodiments, the walking assistance apparatus further includes at least on electrical component associated with the rear support; and a cable extending within the first hollow of the first shaft, the cable configured to electrically connect the at least one electrical component and the driver.

In some example embodiments, the waist frame further includes a driving source bracket configured to connect the first shaft and the second shaft, the driving source bracket having a receiving space therein to receive the driving source.

In some example embodiments, the driving source bracket includes a clamp configured to clamp an external portion of an end portion of the first shaft.

In some example embodiments, the end portion of the first shaft has a non-circular cross section, and the clamp includes a hole having a shape corresponding to the non-circular cross section of the end portion of the first shaft.

In some example embodiments, a hole in the clamp associated with the first shaft extends in a direction parallel to an end portion of the second shaft, the end portion of the second shaft is adjacent to the driving source bracket.

In some example embodiments, the second shaft is configured to connect to an edge portion of the driving source bracket.

In some example embodiments, the waist frame further comprises: an insert connected to the edge portion of the driving source bracket, the insert configured to penetrate a second hollow in the second shaft to connect the second shaft to the driving source bracket, the insert having a shape corresponding to the edge portion of the driving source bracket.

In some example embodiments, an end portion of the first shaft and an end portion of the second shaft have shapes of straight lines and are parallel to each other, and wherein the end portion of the first shaft is adjacent to the driving source bracket, and the end portion of the second shaft is adjacent to the driving source bracket.

In some example embodiments, the driver and the rear support are detachable from the waist frame.

In some example embodiments, the pair of shafts are slidably connected to the rear support such that a horizontal width between the rear support and the driver is adjustable.

In some example embodiments, the pair of shafts include a first shaft having a first straight portion and a second shaft having a second straight portion, the first straight portion and the second straight portion each configured to slidably connect to the rear support such that the first straight portion is parallel to the second straight portion.

In some example embodiments, the walking assistance apparatus is configured to simultaneously adjust the horizontal width between the rear support and the driver and a vertical height between the rear support and the driver based on an insert length of the pair of shafts into the rear support.

In some example embodiments, the pair of shafts include a first shaft having a first straight portion and a second shaft having a second straight portion, the first straight portion and the second straight portion each configured to slide into the rear support such that the first straight portion and the second straight portion are installed toward an outer, lower and front side from the rear support.

In some example embodiments, the rear support includes a rear bracket configured to connect to the pair of shafts; and a rear cover connected to the rear bracket and spaced apart from the pair of shafts.

In some example embodiments, the waist frame includes a driving source bracket configured to connect to the pair of shafts and a side cover of the driver, the side cover being spaced apart from the pair of shafts.

In some example embodiments, a lower shaft of the pair of shafts includes a driving-side straight portion connected to the driver and extending in an upward direction when the user wearing the walking assistance apparatus is standing; a rear straight portion connected to the rear support, the rear straight portion having a shape of a straight line; and a central portion connecting the driving-side straight portion and the rear straight portion.

In some example embodiments, the rear support includes a coccyx support configured to protrude downwards from the rear support such that the coccyx support protrudes lower than the rear straight portion when laterally viewed, the coccyx support configured to support a coccyx of the user.

In some example embodiments, the central portion has a shape bent two times sequentially upward and downward in a direction from the driving-side straight portion to the rear straight portion.

In some example embodiments, the driver includes a left driver and a right driver, the waist frame includes a left waist frame and a right waist frame, and the walking assistance apparatus further includes a front support configured to connect the left waist frame and the right waist frame and to support a front portion of the waist of the user.

In some example embodiments, the front support includes a stiffening plate, the rear support includes a rear bracket configured to connect to the left waist frame and the right waist frame, and the stiffening plate, the left waist frame, the rear bracket, and the right waist frame are each formed of a rigid material and are sequentially connected to form a closed-loop structure around the waist of the user when the user wears the walking assistance apparatus.

In some example embodiments, the walking assistance apparatus is configured to simultaneously adjust a horizontal width between the rear support and the driver, a vertical height between the rear support and the driver, and a horizontal distance between the rear support and the front support based on an insert length of the pair of shafts into the rear support.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
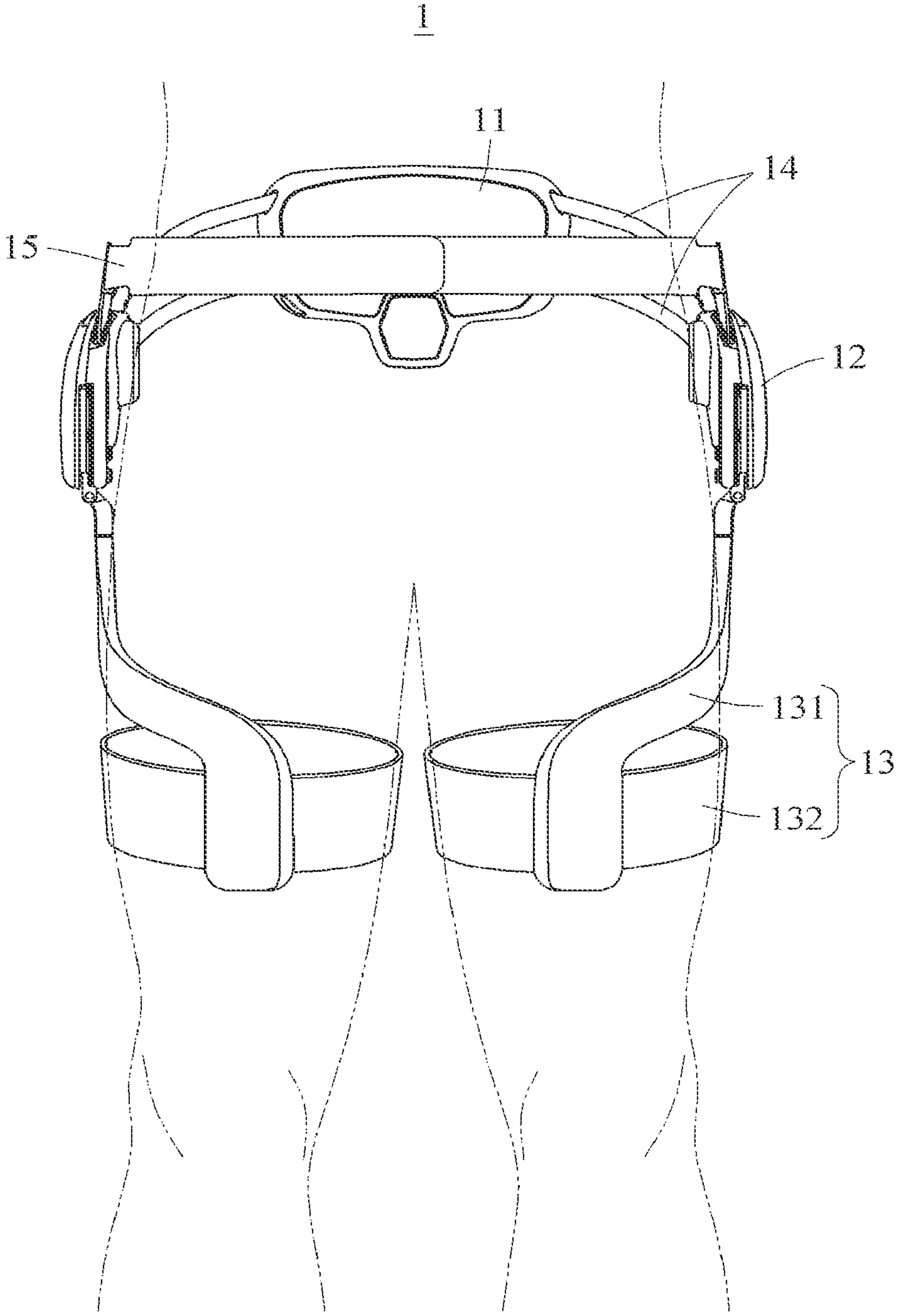
FIG. 1 is a front view illustrating a walking assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
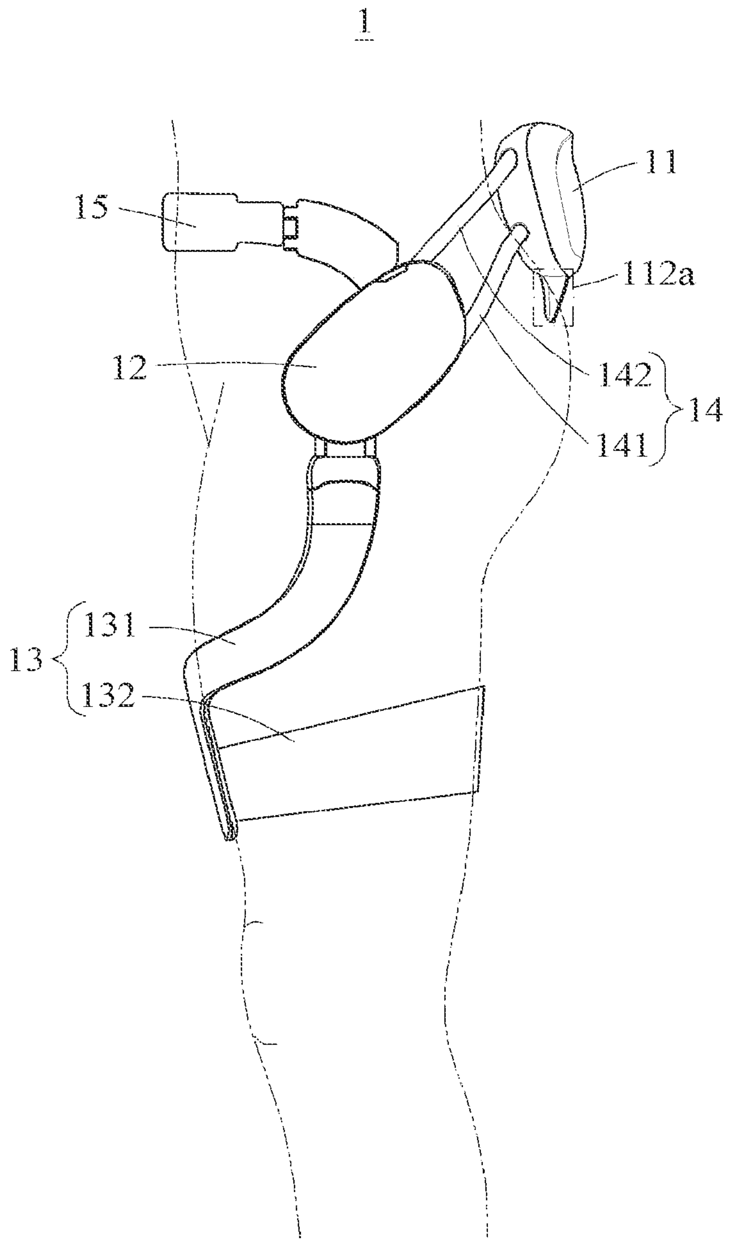
FIG. 2 is a side view illustrating a walking assistance apparatus according to at least one example embodiment.

FIG. 1 is a front view illustrating a walking assistance apparatus according to at least one example embodiment, and FIG. 2 is a side view illustrating the walking assistance apparatus according to at least one example embodiment.

Referring to FIGS. 1 and 2, a walking assistance apparatus 1 may be worn on a user to assist a walking of the user. The user may correspond to a human, an animal, or a robot. However, the user is not limited thereto. Further, an example of the walking assistance apparatus 1 which assist a motion of a hip joint will be described. However, the at least one example embodiment may also apply to the walking assistance apparatus 1 which assists a knee joint and/or an ankle joint using other members connected downstream from a thigh frame 131.

The walking assistance apparatus 1 may include a rear support module 11, a driving module 12, a thigh support 13, a waist frame 14, and a front support module 15. Further, as discussed below with reference to FIG. 4, the walking assistance apparatus 1 may also include one or more electrical components E and a cable C.

The rear support module 11 may support the rear portion of the waist of the user. The rear support module 11 may include, for example, a coccyx support 112*a* configured to protrude downward to support a coccyx of the user. The coccyx support 112*a* may efficiently reduce a phenomenon where the rear support module 11 rotates on a sagittal plane due to a torque generated by the driving module 12. The coccyx support 112*a* may inhibit (or, alternatively, prevent) a clockwise rotation of the rear support module 11 by a reaction force applied from the coccyx of the user while transmitting only a relatively small force to the coccyx, which is a hard part of buttocks of the user.

The driving module 12 may provide a power to assist the motion of the hip joint of the user. As discussed below with reference to FIG. 7, the driving module 12 may include a left driving module 12L and a right driving module 12R respectively disposed on left and right sides of the rear support module 11.

The thigh support 13 may be connected to the driving module 12 and support a thigh of the user. The thigh support 13 may include a thigh wearable portion 132 configured to support the thigh of the user, and a thigh frame 131 configured to connect the driving module 12 and the thigh wearable portion 132 and to transmit a force to rotate the thigh of the user by the power received from the driving module 12.

The waist frame 14 may include a pair of shafts 141 and 142 configured to connect the rear support module 11 and the driving module 12 such that the rear support module 11 and the driving module 12 may not be connected directly to each other but rather may be connected indirectly through the waist frame 14 including the plurality of shafts 141 and 142.

By the above structure, a structure that supports a force and a torque only in directions needed in view of a reaction force generated in practice by the driving module 12, which will be described later, may be provided, and thus the walking assistance apparatus 1 may be manufactured to be relatively thin and light-weighted, when compared to a walking assistance apparatus provided in a shape that encloses a rear portion and a side portion of a waist of the user with a case attached as an integral body. For example, one or more of the pair of shafts 141 and 142 may have a structure including a hollow. In this example, the overall weight of the walking assistance apparatus 1 may be reduced, and the hollow may be utilized as an electrical wiring space as described in more detail later.

As discussed below with reference to FIG. 7, the waist frame 14 may include a left waist frame 14L configured to connect the rear support module 11 and the left driving module 12L, and a right waist frame 14R configured to connect the rear support module 11 and the right driving module 12R. The left waist frame 14L and the right waist frame 14R may each include the pair of shafts 141 and 142 configured to connect the rear support module 11 to respective ones of the left driving module 12L and the right driving module 12R.

The front support module 15 may connect the left waist frame 14L and the right waist frame 14R and support the front portion of the waist of the user. The front support module 15 including a rigid member may provide a closed-loop structure that encloses the waist of the user in conjunction with the rear support module 11 and the waist frame 14 each including a rigid member. By utilizing a rigid material in each of the front support module 15, the rear support module 11 and the waist frame 14 connecting the same, the closed-loop structure may be rigid, thus, reducing twisting caused by torque as compared to a structure where a fabric material is utilized.

Here, the "rigid member" may be a rigid member made of plastic such as carbon fiber reinforced plastic (CFRP), or metal. The above structure may reduce twisting of the rear support module 11 and the waist frame 14 due to the torque generated by the driving module 12. For example, when the user performs a walking motion, the left driving module 12L and the right driving module 12R generate torques to rotate in opposite directions, and thus torsion torques may be applied to the rear support module 11 and the waist frame 14. However, the closed-loop structure may offset the torsion torques at a central portion of the front support module 15, whereby the walking assistance apparatus 1 may be manufactured to be relatively thin and light-weighted.

Figure 3:
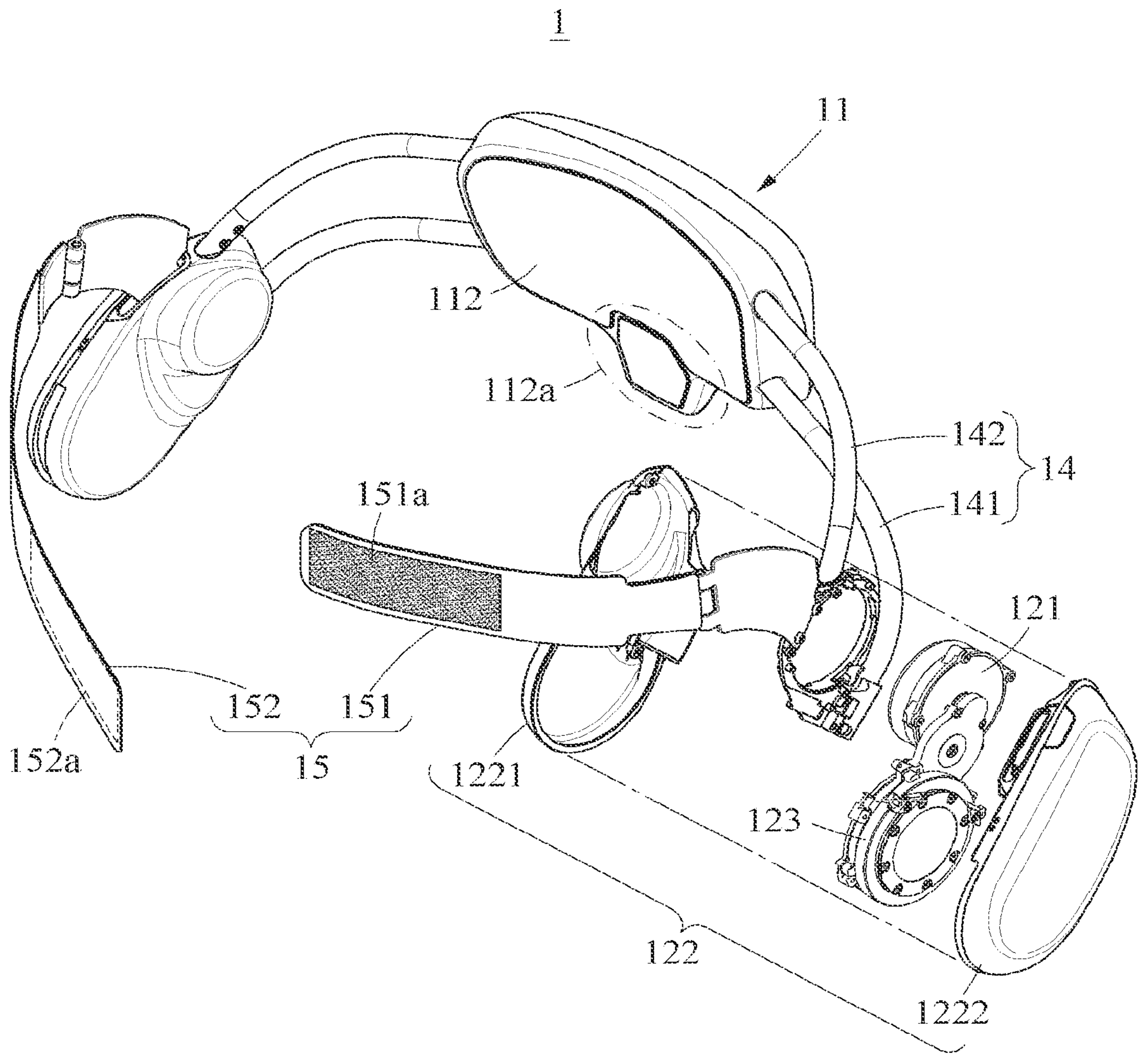
FIG. 3 is an exploded perspective view illustrating a portion of a walking assistance apparatus according to at least one example embodiment.
Figure 4:
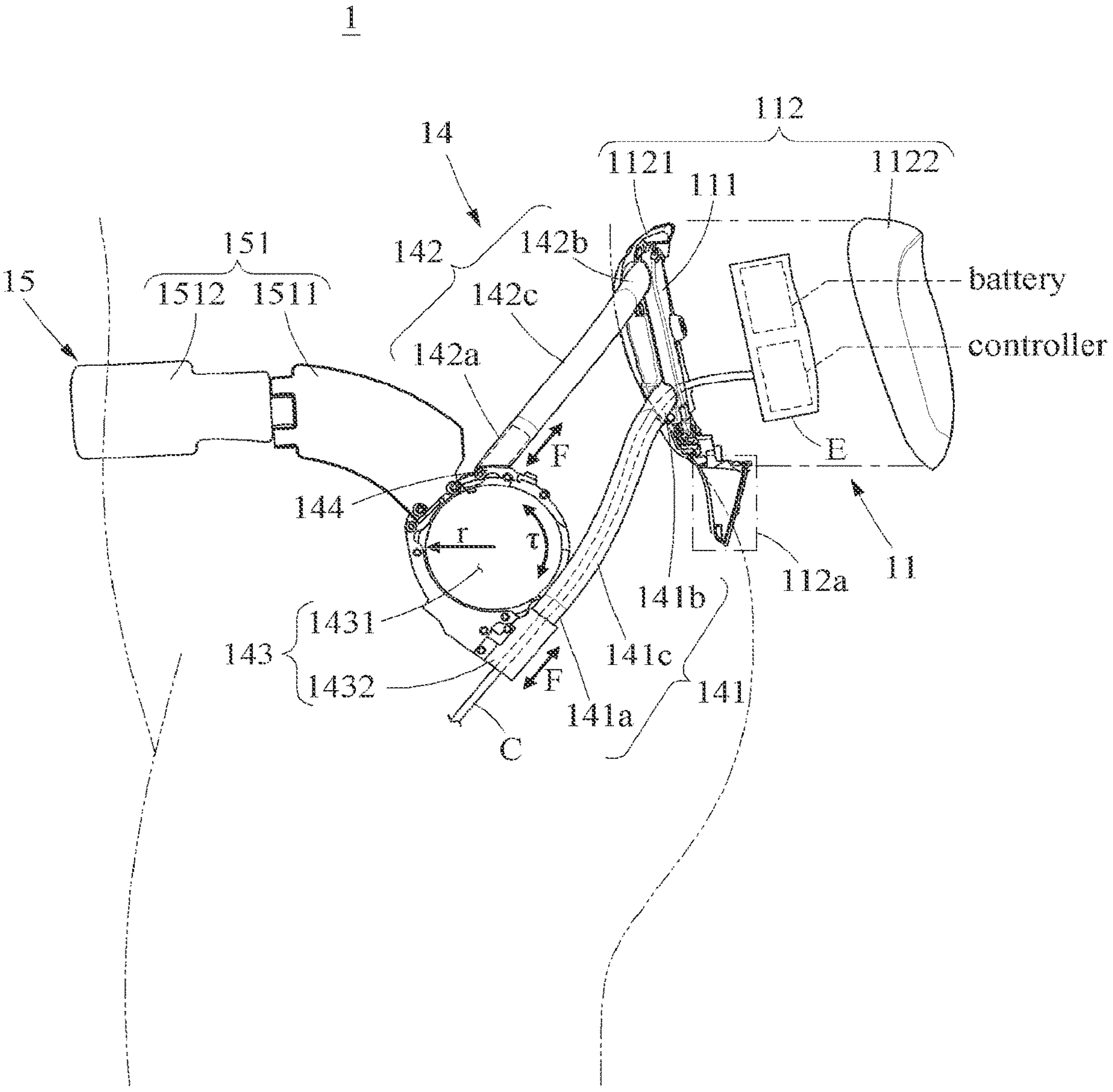
FIG. 4 is a side view illustrating a portion of a walking assistance apparatus according to at least one example embodiment.
Figure 5:
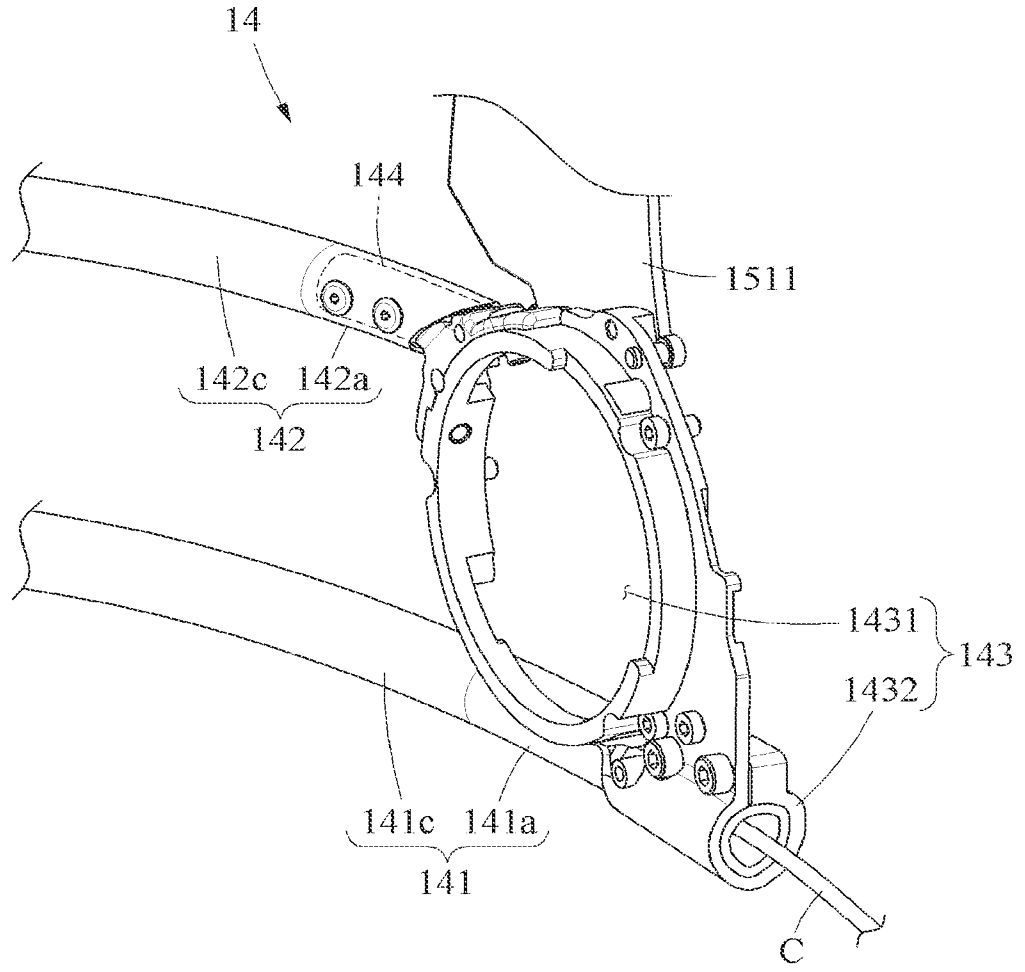
FIG. 5 is a perspective view illustrating a waist frame according to at least one example embodiment.

FIG. 3 is an exploded perspective view illustrating a portion of a walking assistance apparatus according to at least one example embodiment, FIG. 4 is a side view illustrating the portion of the walking assistance apparatus according to at least one example embodiment, and FIG. 5 is a perspective view illustrating a waist frame according to at least one example embodiment Referring to FIGS. 3 through 5, the walking assistance apparatus 1 may include the rear support module 11, the driving module 12, the waist frame 14 and the front support module 15.

Referring to the rear support module 11, the rear support module 11 may include a rear bracket 111 and a rear cover 112. Further, as discussed below with reference to FIG. 6, the rear support module 11 may further include a pressurizing plate 113 and a fastening member 114.

The rear bracket 111 may include a rigid material. The rear cover 112 may include an inner rear cover 1121 which covers an inner side of the electrical component E, and an outer rear cover 1122 which covers an outer side of the electrical component E. The cushioning portion may be installed on the inner rear cover 1121.

The rear bracket 111 may be connected to the left waist frame 14L and the right waist frame 14R. For example, the rear bracket 111 may be connected to the pair of shafts 141 and 142 associated with the left waist frame 14L and the pair of shafts 141 and 142 associated with the right waist frame 14R. For example, as discussed below with reference to FIG. 6, the rear bracket 111 may further include sliding grooves 111*a* (also referred to as sliding hollows) into which the pair of shafts 141 and 142 may slide.

The rear cover 112 may be configured to enclose the rear bracket 111 and contact the rear portion of the waist of the user. The rear cover 112 may include, for example, the coccyx support 112*a*, and a cushioning portion positioned at a portion to contact body of the user, the cushioning portion including a flexible material Further, the rear cover 112 may be connected to the rear bracket 111 and spaced apart from the pair of shafts 141 and 142. That is, the rear cover 112 may not directly contact the pair of shafts 141 and 142. For example, the rear cover 112 may include holes with diameters greater than diameters of the pair of shafts 141 and 142. The above structure may decouple force transmitting paths between the pair of shafts 141 and 142 and the rear cover 112 to some extent. Thus, although the pair of shafts 141 and 142 deform slightly, an external force to be transmitted to the rear cover 112 may be reduced, and a stress to be applied to the rear cover 112 may be reduced, whereby the user wearability and the durability of the rear cover 112 may improve. For example, by utilizing a separate rear cover 112 and a side cover 122 such that a cover does not extend across the pair of shafts 141 142, as compared to a single cover covering the entire device, the durability and/or interference caused by such a single cover assembly is improved.

The rear support module 11 may be detachable from the waist frame 14 (e.g., from the pair of shafts 141 and 142). The above structure may provide the walking assistance apparatus 1 suitable for various body sizes of users using the same driving module 12 and rear support module 11, by replacing the waist frame 14 with one suitable for a body size of a user.

Further, as discussed above, the rear support module 11 may house the one or more electrical components. The one or more electrical components E may include a battery configured to provide a power to drive the driving module 12, and a controller configured to generate a control signal to control the driving module 12. Since the rear support module 11 is detachable from the waist frame 13, the maintenance of the electrical component E received in the rear support module 11 may be easily performed.

Referring to the driving module 12, the driving module 12 may include a driving source 121, a side cover 122, and a fastener 123.

The driving source 121 may generate a rotational power. For example, the driving source 121 may include an electric motor configured to generate a torque using a power received from the electrical component E through the cable C.

The side cover 122 may enclose the driving source 121 and contact a side portion of a pelvis of the user. The side cover 122 may include, for example, a cushioning portion positioned at a portion to contact the body of the user, the cushioning portion including a flexible material. The side cover 122 may include an inner side cover 1221 which covers an inner side of the driving source 121, and an outer side cover 1222 which covers an outer side of the driving source 121. The cushioning portion may be installed on the inner side cover 1221.

The side cover 122 may be connected to the waist frame 14 and spaced apart from the pair of shafts 141 and 142 of the waist frame 14. That is, the side cover 122 may not directly contact the pair of shafts 141 and 142. For example, the side cover 122 may include holes with diameters greater than the diameters of the pair of shafts 141 and 142. The above structure may decouple force transmitting paths between the pair of shafts 141 and 142 and the side cover 122 to some extent. Thus, although the pair of shafts 141 and 142 deform slightly, an external force to be transmitted to the side cover 122 may be reduced, and a stress to be applied to the side cover 122 may be reduced, whereby the user wearability and the durability of the side cover 122 may improve.

The fastener 123 may be connected to the thigh frame 131 (refer to FIG. 2) and transmit the rotational power generated by the driving source 121 to the thigh frame 131. For example, a reducer may be disposed between the driving source 121 and the fastener 123 to increase the torque transmitted to the thigh frame 131.

The driving module 12 may be detachable from the waist frame 14. By the above structure, the maintenance of the driving source 121 may be easily performed. Further, by replacing the waist frame 14 with one suitable for a body size of a user, the walking assistance apparatus 1 suitable for various body sizes of users may be provided using the same driving module 12.

Referring to the waist frame 14, the waist frame 14 may include the pair of shafts 141 and 142, a driving source bracket 143, and an insert 144.

The pair of shafts 141 and 142 may be disposed on opposite sides from a center of the driving source 121. That is, the driving source 121 may be positioned between the pair of shafts 141 and 142. As shown in FIG. 4, the torque generated by the driving source 121 may act as a tensile force or a compressive force "F" on the pair of shafts 141 and 142. As shown in FIG. 4, a moment arm "r" may be secured by sufficiently spacing the pair of shafts 141 and 142 from a center of the torque "$\tau$" generated by the driving source 121, whereby an effect of the torque generated by the driving source 121. Since $\tau = r \times F$, with respect to the same torque r, the tensile force or the compressive force F on the pair of shafts 141 and 142 is decreased by securing an increase in the moment arm r due to the spacing of the pair of shafts 141 and 142 from the center of the torque $\tau$. In other words, the tensile force or the compressive force "F" may be reduced even using a relatively thin and light-weighted structure.

The pair of shafts 141 and 142 may include a first shaft 141 and a second shaft 142. The first shaft 141 may be disposed between a lower side of the rear support module 11 and a lower side of the driving module 12, and the second shaft 142 may disposed between an upper side of the rear support module 11 and an upper side of the driving module 12. However, example embodiments are not limited thereto. For example, unlike the drawings, the first shaft 141 and the second shaft 142 may be positioned in opposite positions relative to each other such that the first shaft 141 is at the upper side and the second shaft 142 is at the lower side.

The first shaft 141 may include a first driving-side straight portion 141*a*, a first rear straight portion 141*b* and a first central portion 141*c*. Likewise, the second shaft 142 may include a second driving-side straight portion 142*a*, a second rear straight portion 142*b* and a second central portion 142*c*. The first driving-side straight portion 141*a*, the first rear straight portion 141*b*, and the first central portion 141*c* may be formed as an integral body, and the second end portion 142*a*, the second rear straight portion 142*b* and the second central portion 142*c* may be formed as an integral body. The second driving-side straight portion 142*a*, the second rear straight portion 142*b*, and the second central portion 142*c* may be formed as an integral body.

The driving-side straight portions 141*a* and 142*a* may be end portions of the pair of shafts 141 and 142 that are adjacent to the driving source bracket 143 and may have shapes of straight lines and be parallel to each other to connect to the driving module 12 and extend upward. For example, the second driving-side straight portion 142*a* may be parallel to the first driving-side straight portion 141*a*.

By the above structure, the torque generated by the driving source 121 may be applied in a direction parallel to the end portions 141*a* and 142*a* of the pair of shafts 141 and 142. Thus, when compared to an example in which the torque is applied obliquely, the effect of the torque generated by the driving source 121 may be reduced even using the relatively thin and light-weighted structure.

The first rear straight portion 141*b* and the second rear straight portion 142*b* may each have a shape of a straight line connected to the rear support module 11. The first central portion 141*c* may connect the first driving-side straight portion 141*a* and the first rear straight portion 141*b*.

The first central portion 141*c* may have a shape bent two times sequentially upward and downward in a direction from the first driving-side straight portion 141*a* to the first rear straight portion 141*b*. Likewise, the second central portion 142*c* may connect the second driving-side straight portion 142*a* and the second rear straight portion 142*b*.

By the above shape, the first shaft 141 may be disposed along a recessed region of a rear-side portion of the waist of the user, that is, an upper portion of gluteal muscles, while avoiding the protruding buttocks of the user. Thus, a protruding height of the first shaft 141 from the body of the user may be reduced without deteriorating the user wearability.

The first shaft 141 may include a hollow which extends in a longitudinal direction of the first shaft 141. The cable C configured to electrically connect the one or more electrical components E and the driving source 121 may be disposed along the hollow of the first shaft 141. By the above structure, a separate wiring space may not be needed, and thus a volume of the walking assistance apparatus 1 may be reduced. Further, rather than performing a complex wiring task of hanging the cable C on a wall of a component or tying a plurality of cables C, a simple wiring task of inserting the cable C along the hollow of the first shaft 141 may be performed.

Meanwhile, the coccyx support 112*a* may protrude toward a lower position than the first rear straight portion 141*b* when laterally viewed. For example, the coccyx support 112*a* may extend downward to a height of a central region of the first central portion 141*c* when laterally viewed. The coccyx support 112*a* may have a shape with a width narrower than another portion adjacent thereto. The coccyx support 112*a* may have a shape with a width decreasing toward a lower position. By the above shape, without a need for unnecessarily increasing an overall volume of the rear support module 11, the coccyx support 112*a* may perform the corresponding function. Further, the coccyx support 112*a* may stably support a portion positioned in a recessed region between the buttocks of the user, that is, a coccygeal portion with a thin skin.

The second shaft 142 may be connected to an edge portion of the driving source bracket 143. For example, as shown in FIGS. 3 and 4, the second shaft 142 may be connected to a side surface of the edge portion of the driving source bracket 143. By the above structure, a thickness increased by the second shaft 142 may be reduced. The driving source bracket 143 may be separately connected to the pair of shafts 141 and 142 included in the waist frame 14, the driving module 12, and the stiffening plate 151 included in the front support module 15. The driving source bracket 143 may include a receiving space 1431 and a clamp 1432.

The receiving space 1431 may provide a space to receive the driving source 121. For example, the driving source 121 may have a structure detachable from the receiving space 1431.

The clamp 1432 may clamp an external portion of the end portion 141*a* of the first shaft 141. The clamp 1432 may not obstruct the hollow of the first shaft 141, and thus the first shaft 141 may be utilized as a wiring space.

The pair of shafts 141 and 142 may be manufactured using a same rigid material, for example, carbon fiber reinforced plastic (CFRP), that allows the pair of shafts 141 and 142 to be hollow while sufficiently rigid. However, example embodiments are not limited thereto. For example, in other example embodiments, the pair of shafts 141 and 142 may be formed of different material, such as a metal, that allows the shafts to be hollow while sufficiently rigid. Still, in other example embodiments, only a first one of the first shaft 141 and the second shaft 142 may be hollow to allow the cable C to be inserted therein, while a second one of the first shaft 141 and the second shaft 142 may be solid and formed of the same or different materials.

As shown in FIG. 5, the end portion 141*a* of the first shaft 141 may have a non-circular cross section, and the clamp 1432 may include a hole having a shape corresponding to the cross section of the end portion 141*a* of the first shaft 141. The above structure may inhibit (or, alternatively, prevent) a misassembly or an idling of the first shaft 141 with respect to the clamp 1432. Thus, a waste of the torque generated by the driving module 12 may be inhibited (or, alternatively, prevented). Further, a decrease in the durability caused by a residual stress generated in the entire walking assistance apparatus 1 due to the misassembly of the first shaft 141 may be inhibited (or, alternatively, prevented).

The hole in the clamp 1432 may extend in a direction parallel to the end portion 142*a* of the second shaft 142 adjacent to the driving source bracket 143. That is, the clamp 1432 may guide the first driving-side straight portion 141*a* to be inserted to be parallel to the second driving-side straight portion 142*a*.

The first shaft 141 may be detachable from the clamp 1432. The clamp 1432 may have a structure capable of adjusting a clamping force to clamp the first shaft 141. The clamp 1432 may include a loop portion, and a fastening member configured to adjust a pressure of the loop portion. Meanwhile, unlike the drawings, the first shaft 141 may also be connected directly to the driving source bracket 143 without using the clamp 1432.

The insert 144 may be utilized as a medium to connect the second shaft 142 to the edge portion of the driving source bracket 143. The insert 144 may stably attach the end portion 142*a* of the second shaft 142 having an approximately round shape to the edge portion of the driving source bracket 143. The insert 144 may be inserted and attached to a hollow of the second shaft 142 and have a shape corresponding to a shape of the edge portion of the driving source bracket 143. For example, in a process of manufacturing the second shaft 142 through a blowing process of a material such as the carbon fiber reinforced plastic (CFRP), the insert 144 may be attached to the second shaft 142 by inserting the insert 144 into a base material to be used to form the second shaft 142. The hollow of the end portion 142*a* of the second shaft 142 may have a non-circular cross section, and the insert 144 may include an inserting portion with an outer surface of a shape corresponding to a shape of the hollow. The above structure may inhibit (or, alternatively, prevent) a misassembly or an idling of the second shaft 142 with respect to the insert 144.

The insert 144 may be attached to or detached from the driving source bracket 143 through a fastening bolt or an engaging structure. Meanwhile, unlike the drawings, the second shaft 142 may also be connected directly to the driving source bracket 143 without using the insert 144.

Referring to the front support module 15, the front support module 15 may include a pair of stiffening plates 151, 152 that include fastening devices 151*a* and 152*a*, respectively. The pair of stiffening plates 151 and 152 may include a left stiffening plate 151 attached to the left waist frame 14L and a right stiffening plate 152 attached to the right waist frame 14R.

The left stiffening plate 151 and the right stiffening plate 152 may respectively include the fastening devices 151*a* and 152*a* such that a fastening length therebetween may be adjustable. The fastening devices 151*a* and 152*a* may include a hook-and-loop fastener, a belt, or a buckle. The fastening devices 151*a* and 152*a* may be used to adjust an area of overlap between the left stiffening plate 151 and the right stiffening plate 152, thereby adjusting the size of the walking assistance apparatus 1 to be suitable for various body sizes of users.

The left stiffening plate 151 and the right stiffening plate 152 may each include a member of a rigid material, and a cushioning portion disposed on an inner side surface of the member of the rigid material, the cushioning portion to contact the body of the user.

At least a portion of the left stiffening plate 151 and the right stiffening plate 152 may include a frame fixture 1511 to be attached to the driving source bracket 143, and a rotating portion 1512 installed to rotate with respect to the frame fixture 1511. The frame fixture 1511 and the rotating portion 1512 may enable the user to wear the walking assistance apparatus 1 conveniently.

Referring to FIGS. 1 through 5, the walking assistance apparatus 1 may form a closed-loop structure around the waist of the user via the front support module 15, and the waist frame 14, the rear support module 11. For example, the right stiffening plate 152 and the left stiffening plate 151 of the front support module 15, the pair of shafts 141, 142 associated with the left waist frame 14L, the rear bracket 111 associated with the rear support module 11, and the pair of shafts 141, 142 associated with the right waist frame 14R may each be formed of a rigid material and may be sequentially connected to form the closed-loop structure around the waist of the user, whereby the walking assistance apparatus 1 may be manufactured to be thin and light-weighted while having a sufficiently high torsional rigidness.

Figure 6:
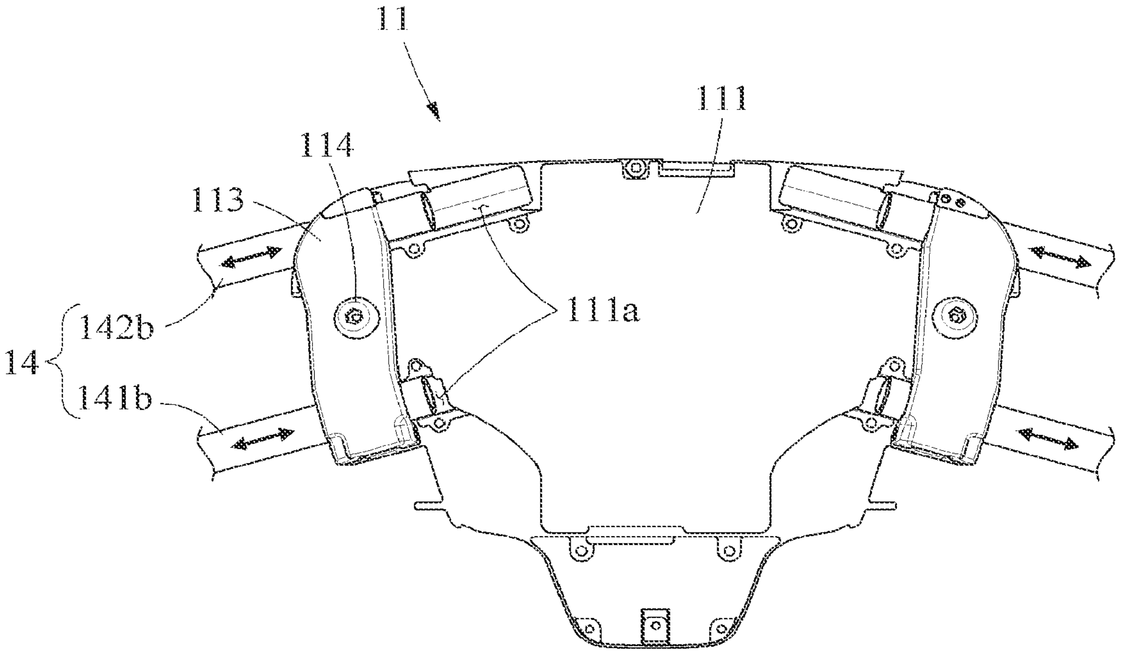
FIG. 6 is a front view illustrating a rear support module and a waist frame connected thereto according to at least one example embodiment.

FIG. 6 is a front view illustrating a rear support module and a waist frame connected thereto according to at least one example embodiment. FIG. 7 is a top view illustrating an example of adjusting a horizontal width and a horizontal distance of a walking assistance apparatus according to at least one example embodiment, and FIG. 8 is a side view illustrating an example of adjusting the horizontal distance and a vertical height of the walking assistance apparatus according to at least one example embodiment.

Figure 7:
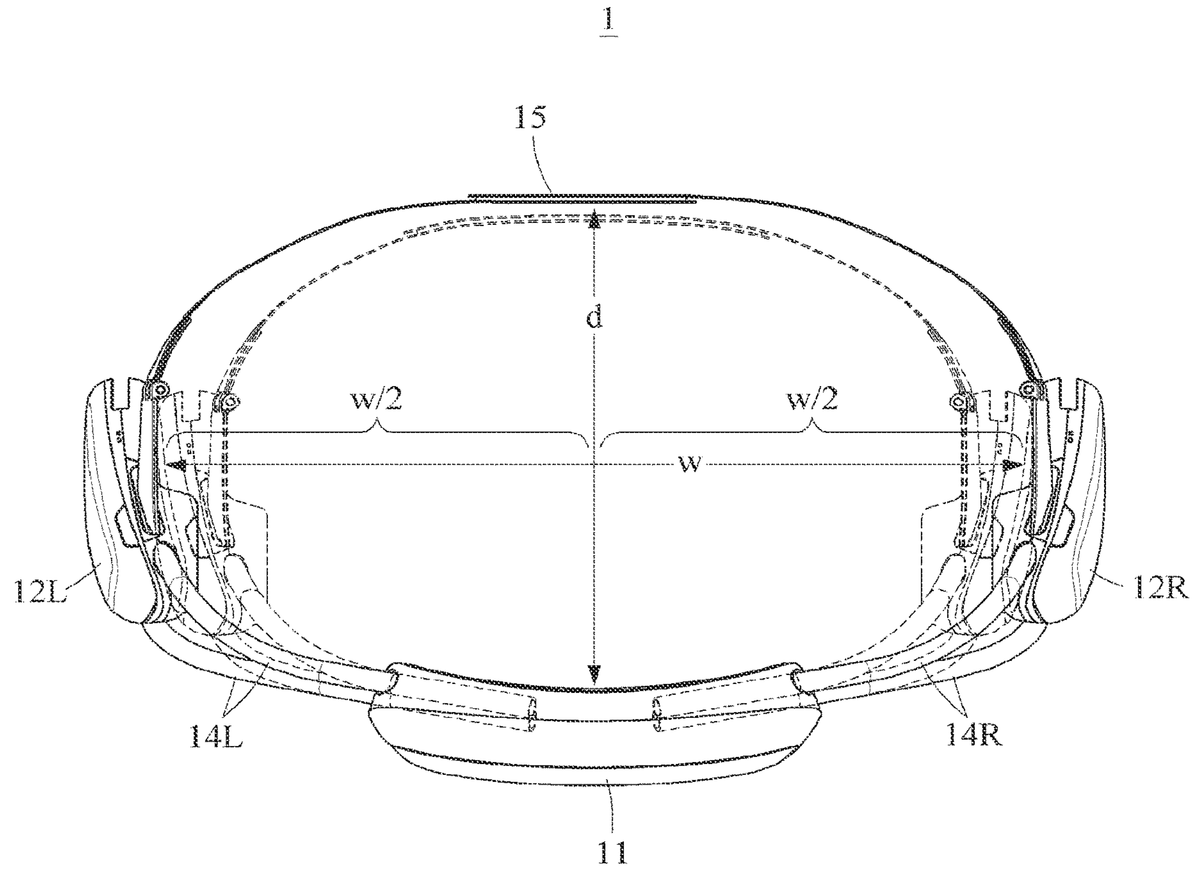
FIG. 7 is a top view illustrating an example of adjusting a horizontal width and a horizontal distance of a walking assistance apparatus according to at least one example embodiment.
Figure 8:
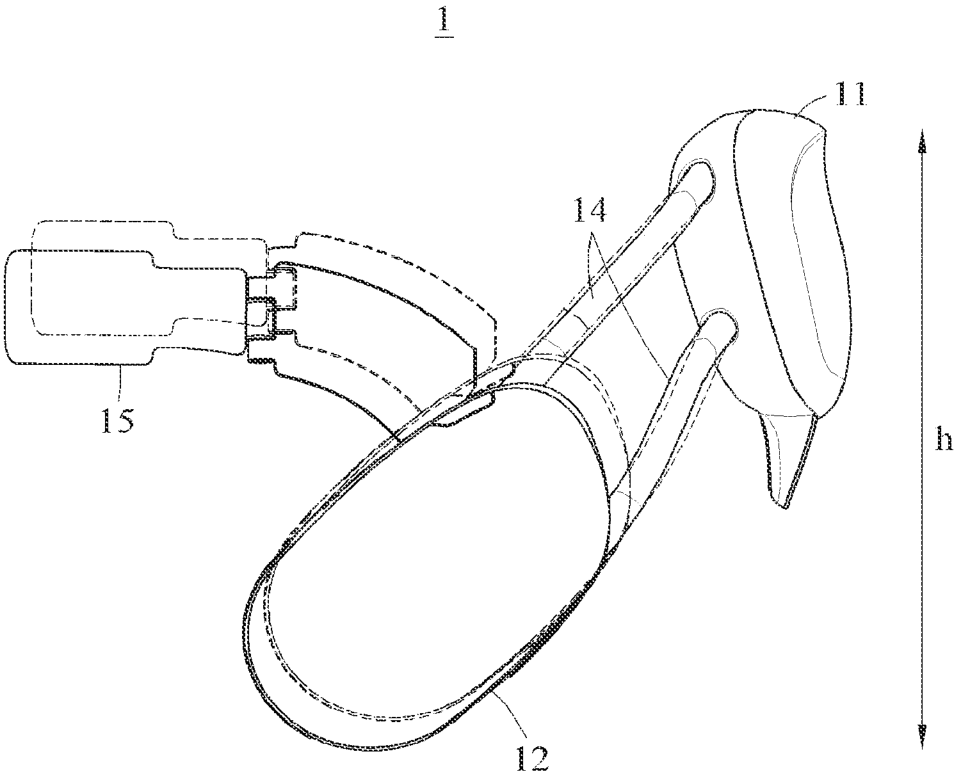
FIG. 8 is a side view illustrating an example of adjusting a horizontal distance and a vertical height of a walking assistance apparatus according to at least one example embodiment.

Referring to FIGS. 6 through 8, the pair of shafts 141 and 142 may be slidably connected to the rear support module 11. For example, as discussed above, the pair of shafts 141 and 142 may include the pair of straight portions 141*b* and 142*b*, respectively, having shapes of straight lines parallel to each other such that the second rear straight portion 142*b* may be parallel to the first rear straight portion 141*b*.

The pair of shafts 141 and 142 (e.g., the pair of straight portions 141*b* and 142*b*) may slide into the sliding grooves 111*a* included in the rear bracket 111, and the pressurizing plate 113 and the fastening member 114 included in the rear support module 11 may be configured to pressurize the pair of shafts 141 and 142 (e.g., the pair of straight portions 141*b* and 142*b*) in the sliding grooves 111*a* to fasten the pair of shafts 141 and 142 to the rear support module 11. The above structure may adjust an insert length of the pair of shafts 141 and 142 into the rear support module 11, thereby adjusting a horizontal width w/2 between the rear support module 11 and the driving module 12.

The sliding grooves 111*a* may be shaped in straight lines corresponding to the pair of straight portions 141*b* and 142*b*. The above structure may maintain a distance between the pair of shafts 141 and 142 in a process of adjusting an insert length of the waist frame 14, and thus an increase in an unexpected stress on the waist frame 14 may be inhibited (or, alternatively, prevented). Further, in a process of adjusting a horizontal width w between the left driving module 12L and the right driving module 12R, an angle of a drive shaft of each driving module 12L, 12R may be maintained the same. Thus, the walking assistance apparatus 1 suitable for various body sizes of users may be provided, and a misalignment between the drive shaft and a hip joint axis during the size adjusting process may be inhibited (or, alternatively, prevented).

Further, the pair of straight portions 141*b* and 142*b* may each be installed to be inclined in the rear support module 11 toward a lower, front and outer side from the rear support module 11. In particular, the pair of straight portions 141*b* and 142*b* may each be installed to be inclined in the rear support module 11 toward a lower, front side from the rear support module 11 and an outer side from the rear support module 11 perpendicular to a sagittal plane of the user. The above structure may adjust the insert length of the pair of shafts 141 and 142 into the rear support module 11, thereby adjusting the horizontal width w/2 between the rear support module 11 and the driving module 12, a vertical height h between the rear support module 11 and the driving module 12, and a horizontal distance d between the rear support module 11 and the front support module 15 at the same time. Considering that a user having a relatively great waist width generally has a relatively great waist thickness, the walking assistance apparatus 1 suitable for various body sizes of users may be provided through a simple adjustment.

Further still, the pair of straight portions 141*b* and 142*b* may have non-circular cross sections, and the sliding grooves 111*a* may have shapes corresponding to the shapes of the pair of straight portions 141*b* and 142*b*. The above structure may inhibit (or, alternatively, prevent) a misassembly or an idling of the pair of straight portions 141*b* and 142*b* with respect to the sliding grooves 111*a*.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wearable apparatus, comprising:

a rear support configured to support a rear portion of a waist of a user;

a driver configured to provide power to assist a motion of a hip joint of the user wearing the wearable apparatus, wherein the driver includes a driving source configured to generate rotational power;

a thigh support configured to support a thigh of the user; and a waist frame including a shaft configured to be connected to the rear support and a driving source bracket configured to connect the shaft and the driver, wherein the shaft is configured as a pair, the pair of shafts includes a first shaft and a second shaft, the first shaft configured to be on a first side of the driver and the second shaft configured to be on a second side of the driver;

wherein a side cover of the driver is configured to be mounted proximate a side portion of a pelvis of the user, wherein the driving source bracket comprises a clamp configured to clamp the shaft, wherein the clamp comprises a loop portion and a fastening member configured to adjust a pressure of the loop portion, and wherein the waist frame further comprises a driving source bracket configured to connect the first shaft and the second shaft, the driving source bracket configured to receive the driving source, and an insert connected to an edge portion of the driving source bracket, the insert configured to penetrate a hollow in the second shaft to connect the second shaft to the edge portion of the driving source bracket.

2. The wearable apparatus of claim 1, wherein the first shaft includes a first hollow extending in a longitudinal direction of the first shaft, the apparatus further comprising:

at least one electrical component associated with the rear support; and a cable extending within the first hollow of the first shaft, the cable configured to electrically connect the at least one electrical component and the driver.

3. The wearable apparatus of claim 1, wherein the clamp is configured to clamp an external portion of an end portion of the first shaft, wherein:

the end portion of the first shaft has a non-circular cross section, and the clamp includes a hole having a shape corresponding to the non-circular cross section of the end portion of the first shaft, and/or a hole in the clamp associated with the first shaft extends in a direction parallel to an end portion of the second shaft, the end portion of the second shaft is adjacent to the driving source bracket.

4. The wearable apparatus of claim 1, wherein an end portion of the first shaft and an end portion of the second shaft have shapes of straight lines and are parallel to each other, and wherein the end portion of the first shaft is adjacent to the driving source bracket, and the end portion of the second shaft is adjacent to the driving source bracket.

5. The wearable apparatus of claim 1, wherein the driver and the rear support are detachable from the waist frame.

6. The wearable apparatus of claim 1, wherein the pair of shafts are slidably connected to the rear support, wherein a gap between the rear support and the driver is adjustable.

7. The wearable apparatus of claim 6, wherein the pair of shafts include a first shaft having a first straight portion and a second shaft having a second straight portion, the first straight portion and the second straight portion each configured to slidably connect to the rear support, wherein the first straight portion is parallel to the second straight portion.

8. The wearable apparatus of claim 7, wherein the wearable apparatus is configured to simultaneously adjust a horizontal width between the rear support and the driver and a vertical height between the rear support and the driver based on an insert length of the pair of shafts into the rear support, wherein the pair of shafts includes a first shaft having a first straight portion and a second shaft having a second straight portion, the first straight portion and the second straight portion each configured to slide into the rear support, wherein the first straight portion and the second straight portion are installed toward an outer, lower and front side from the rear support.

9. The wearable apparatus of claim 1, wherein the rear support comprises:

a rear bracket configured to connect to the pair of shafts; and a rear cover connected to the rear bracket and spaced apart from the pair of shafts.

10. The wearable apparatus of claim 1, wherein a lower shaft of the pair of shafts comprises:

a driving-side straight portion connected to the driver and configured to be extending in an upward direction when the user wearing the wearable apparatus is standing;

a rear straight portion connected to the rear support, the rear straight portion having a shape of a straight line; and a central portion connecting the driving-side straight portion and the rear straight portion;

wherein either:

the rear support comprises a coccyx support configured to protrude downwards from the rear support, wherein the coccyx support protrudes lower than the rear straight portion when laterally viewed, the coccyx support configured to support a coccyx of the user, or the central portion has a shape bent two times sequentially upward and downward in a direction from the driving-side straight portion to the rear straight portion.

11. The wearable apparatus of claim 1, wherein the driver includes a left driver and a right driver, the waist frame includes a left waist frame and a right waist frame, and wherein the wearable apparatus further comprises:

a front support configured to connect the left waist frame and the right waist frame and to support a front portion of the waist of the user;

wherein:

the front support includes a stiffening plate, the rear support includes a rear bracket configured to connect to the left waist frame and the right waist frame, and the stiffening plate, the left waist frame, the rear bracket, and the right waist frame are each formed of a rigid material and are sequentially connected and configured to form a closed-loop structure around the waist of the user when the user wears the wearable apparatus, and/or the wearable apparatus is configured to simultaneously adjust a horizontal width between the rear support and the driver, a vertical height between the rear support and the driver, and a horizontal distance between the rear support and the front support based on an insert length of the pair of shafts into the rear support.

12. The wearable apparatus of claim 1, wherein the driver is spaced apart from the shaft, at least by the driving source bracket.

* * * * *